US009454029B2

(12) United States Patent
Wu et al.

(10) Patent No.: US 9,454,029 B2
(45) Date of Patent: Sep. 27, 2016

(54) TOUCH-SENSING LIQUID CRYSTAL PANEL (71) Applicant: HannStar Display Corporation, New Taipei (TW)

(72) Inventors: Hsu-Ho Wu, Tainan (TW); Yu-Cheng Lin, Pingtung County (TW); Ping-Yuan Su, Kaohsiung (TW); Kun-Hua Tsai, Tainan (TW); Hsing-Ying Lee, Tainan (TW)

(73) Assignee: HannStar Display Corporation, Taipei (TW)

( * ) Notice: Subject to any disclaimer, the term of this patent is extended or adjusted under 35 U.S.C. 154(b) by 315 days.

(21) Appl. No.: 14/242,882

(22) Filed: Apr. 2, 2014

(65) Prior Publication Data
US 2014/0368752 A1 Dec. 18, 2014

(30) Foreign Application Priority Data
Jun. 17, 2013 (CN) .......................... 2013 1 0238084

(51) Int. Cl.
*G02F 1/1335* (2006.01)
*G02F 1/1333* (2006.01)
*G02F 1/1345* (2006.01)
*G06F 3/041* (2006.01)
*G06F 3/044* (2006.01)

(52) U.S. Cl.
CPC ....... *G02F 1/13338* (2013.01); *G02F 1/13452* (2013.01); *G06F 3/044* (2013.01); *G06F 3/0412* (2013.01)

(58) Field of Classification Search
CPC ... G02F 1/13338; G06F 3/0412; G06F 3/044
USPC .......................................................... 349/12
See application file for complete search history.

(56) References Cited

U.S. PATENT DOCUMENTS

2007/0268243 A1* 11/2007 Choo .................. G02F 1/13338
345/104
2011/0141042 A1* 6/2011 Kim .................... G02F 1/13338
345/173

* cited by examiner

*Primary Examiner* — Lucy Chien
(74) *Attorney, Agent, or Firm* — CKC & Partners Co., Ltd.

(57) ABSTRACT

A touch-sensing liquid crystal panel is provided and includes a color filter substrate and a transistor substrate. The color filter substrate includes a first substrate, a sensing array, touch-sensing circuit contact pads, and color filters. The transistor substrate includes a second substrate and pixel units. In one embodiment, the first substrate has a first edge region and a second edge region having the same width. In another embodiment, the touch-sensing circuit contact pads are disposed at the first edge region and the second edge region of the first substrate, and each conductive pattern in the sensing array is connected to the touch-sensing circuit contact pads of the first edge region and the second edge region. In another embodiment, each conductive pattern of the sensing array includes two first conductive patterns and conductive pattern rows disposed between the first conductive patterns.

14 Claims, 9 Drawing Sheets

TOUCH-SENSING LIQUID CRYSTAL PANEL

RELATED APPLICATIONS

This application claims priority to Chinese Application Ser. No. 201310238084.8, filed Jun. 17, 2013, which is herein incorporated by reference.

BACKGROUND

1. Field of Invention

The present disclosure relates to a touch-sensing liquid crystal panel (LCD). More particularly, the present disclosure relates to a touch-sensing liquid crystal panel for preventing a flexible printed circuit board of a touch-sensing circuit from overlapping with that of a driving circuit.

2. Description of Related Art

In recent years, light and thin flat displays have become extensively used displays in various types of electronic products. For achieving use convenience, a brief appearance and multiple functions, input devices, such as conventional keyboards or mice, are replaced by touch-sensing panels as the input devices for many information products.

With a rapid technical development of flat displays and touch-sensing input devices, in order to have a larger visible frame and provide a more convenient operating mode under a limited volume, in some electronic products, the touch-sensing panels are combined with display panels to form touch display panels. Because having both a display function of the display panels and input operation convenience through the touch panels, the touch display panels have gradually become important equipment of the electronic products, such as a handheld PC, a personal digital assistance (PDA) or a smart phone, etc.

The operating principle of the touch-sensing panel is that, when a conductive object (such as a finger) contacts a touch-sensing array of the touch-sensing panel, an electrical property (such as resistance or capacitance) of the touch-sensing array is changed and induces a bias change of the touch-sensing array. The change of the electrical property will be transformed to a control signal transmitted to an external control circuit, and processed and calculated by a processor to obtain a result. Then, a display signal is outputted to the display panel by the external control circuit, and an image is displayed before a user's eyes by the display panel.

In the current liquid crystal panels, a driving circuit and a touch-sensing circuit of a liquid crystal panel are connected to a glass substrate via flexible is printed circuit boards. However, the flexible printed circuit board of the driving circuit is generally overlapped with that of the touch-sensing circuit, thus affecting the sensing efficacy of the touch-sensing circuit.

Therefore, a touch-sensing liquid crystal panel is needed to preventing the flexible printed circuit board of the touch-sensing circuit from overlapping with that of the driving circuit.

SUMMARY

An aspect of the present disclosure is to provide a touch-sensing liquid crystal panel to prevent a flexible printed circuit board of a touch-sensing circuit from overlapping with that of a driving circuit by changing positions of contact pads.

According to an embodiment of the present disclosure, the touch-sensing liquid crystal panel includes a color filter substrate and a transistor substrate. The color filter substrate includes a first substrate, touch-sensing circuit contact pads, a sensing array and color filters. The first substrate has a visible region and edge regions surrounding the visible region. The edge regions include a first edge region and a second edge region opposite to the first edge region. A width of the second edge region is the same as a width of the first edge region. The touch-sensing circuit contact pads are disposed in the first edge region. The sensing array is disposed on the first substrate and is electrically connected to the touch-sensing circuit contact pads. The color filters are disposed on the first substrate. The transistor substrate includes a second substrate and pixel units disposed on the second substrate.

According to another embodiment of the present disclosure, the touch-sensing liquid crystal panel includes a color filter substrate and a transistor substrate. The color filter substrate includes a first substrate, first touch-sensing circuit contact pads, second touch-sensing circuit contact pads, a sensing array and color filters. The first substrate has a visible region and edge regions surrounding the visible region. The edge regions include a first edge region and a second edge region opposite to the first edge region. The first touch-sensing circuit contact pads are disposed in the second edge region. The second touch-sensing circuit contact pads are disposed in the first edge region. The sensing array is disposed on the first substrate and includes conductive patterns, in which each of the conductive patterns is electrically connected to one of the first touch-sensing circuit contact pads or one of the second touch-sensing circuit contact pads. The color filters are disposed on the first substrate. The transistor substrate includes a second substrate and pixel units. The pixel units are disposed on the second substrate.

According to another embodiment of the present disclosure, the touch-sensing liquid crystal panel includes a color filter substrate and a transistor substrate. The color filter substrate includes a first substrate, touch-sensing circuit contact pads, a sensing array and color filters. The first substrate has a visible region and edge regions surrounding the visible region. The edge regions include a first edge region and a second edge region opposite to the first edge region. The touch-sensing circuit contact pads are disposed in the first edge region. The sensing array is disposed on the first substrate and is electrically connected to the touch-sensing circuit contact pads, in which the sensing array includes conductive pattern sets. Each of the conductive pattern sets includes two first conductive patterns and conductive pattern rows. The conductive pattern rows are disposed between the two first conductive patterns, in which each of the conductive pattern rows includes two second conductive patterns electrically connected to each other, and each of the conductive pattern rows is electrically connected to one of the touch-sensing circuit contact pads. The color filters are disposed on the first substrate. The transistor substrate includes a second substrate and pixel units. The pixel units are disposed on the second substrate.

It can be known from the above description that, in the touch-sensing liquid crystal panel of the present disclosure, positions of the touch-sensing circuit contact pads or an arrangement of the conductive patterns of the sensing array are changed to for alternately disposing the panel driving circuit contact pads and the touch-sensing circuit contact pads, thereby preventing the flexible printed circuit board of the (panel) driving circuit from overlapping with that of the touch-sensing circuit.

BRIEF DESCRIPTION OF THE DRAWINGS

These and other features, aspects, advantages and embodiments of the present disclosure will become better understood with regard to the following accompanying drawings where:

FIG. 2 is a schematic cross-sectional diagram viewed along a cut line A-A' in FIG. 1a;

DETAILED DESCRIPTION

Figure 1A:
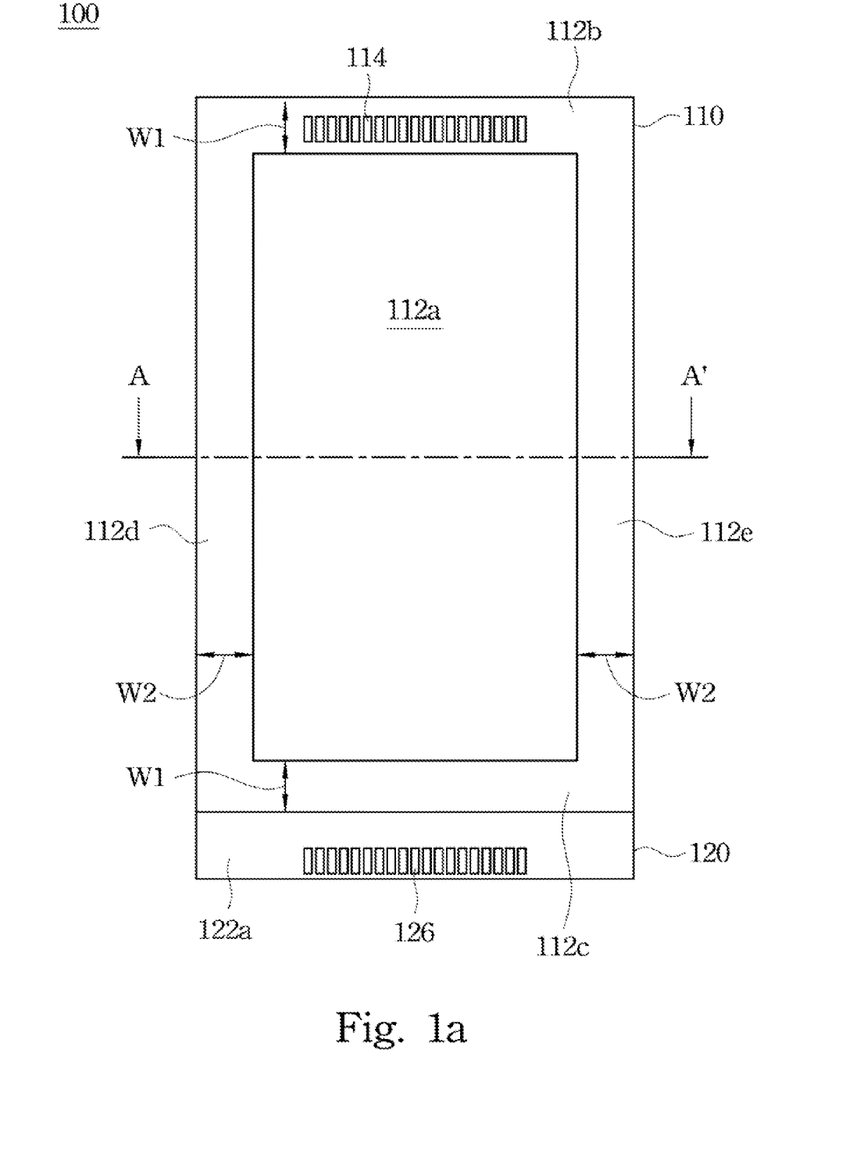
FIG. 1a is a schematic top view showing a touch-sensing liquid crystal panel in accordance with an embodiment of the present disclosure.
Figure 2:
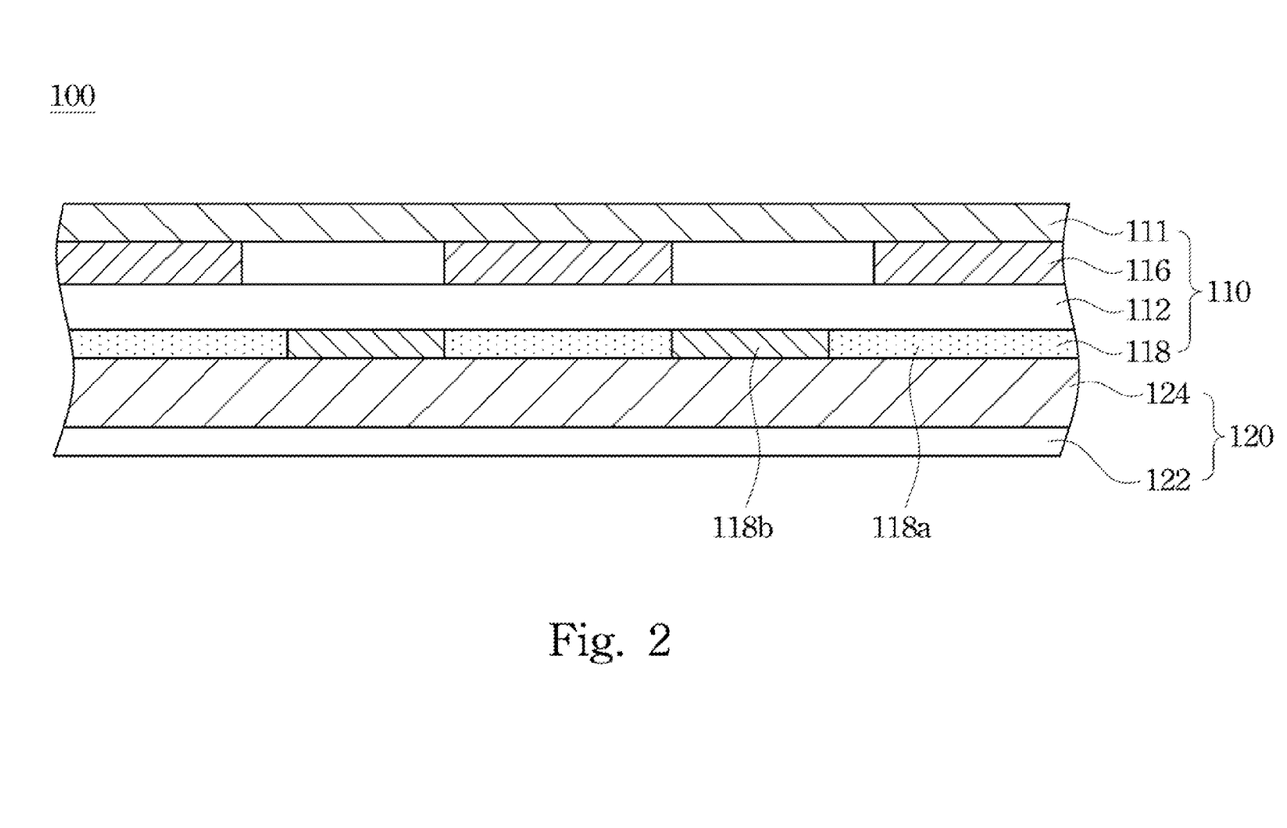

Referring to FIG. 1a together with FIG. 2, FIG. 1a is a schematic top view showing a touch-sensing liquid crystal panel 100 in accordance with an embodiment of the present disclosure, and FIG. 2 is a schematic cross-sectional diagram viewed along a line A-A' in FIG. 1a. A touch-sensing liquid crystal panel 100 includes a color filter substrate 110 and a transistor substrate 120. The transistor substrate 120 includes a substrate 122, a pixel layer 124 and contact pads 126. The color filter substrate 110 includes a protective layer 111, a substrate 112, contact pads 114, a sensing array 116 and color filters 118. The color filter substrate 110 is disposed on the transistor substrate 120, thereby sandwiching the pixel layer 124 between the substrate 122 and the color filters 118. In the present embodiment, the substrates 112 and 122 are formed substantially from glass, but embodiments of the present disclosure are not limited thereto. In other embodiments, the substrates 112 and 122 are formed substantially from polymethylmethacrylate (PMMA) or other transparent materials.

Figure 1B:
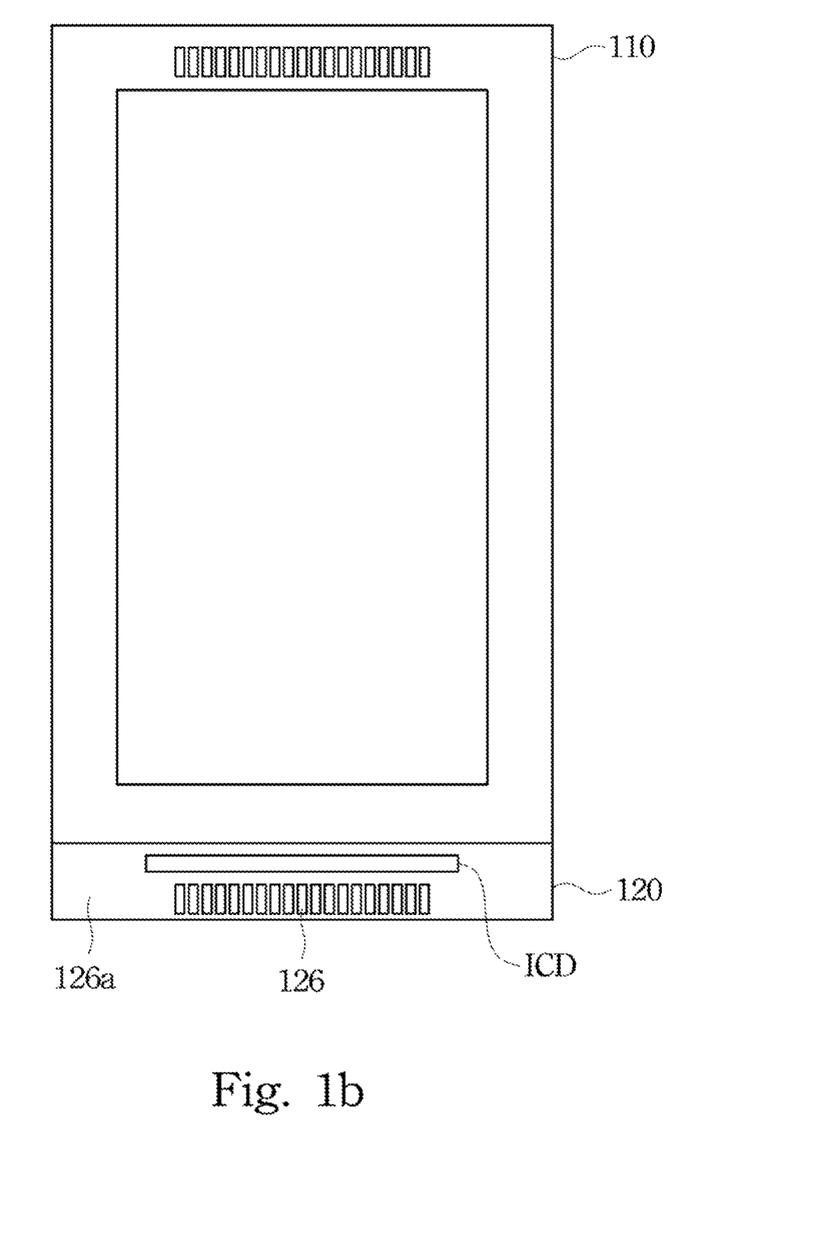
FIG. 1b is a schematic top view showing a touch-sensing liquid crystal panel in accordance with an embodiment of the present disclosure.

In the transistor substrate 120 the pixel layer 124 is disposed on the substrate 122. The pixel layer 124 includes pixel units (not shown), and each of the pixel units includes structures of a transistor switch, a pixel electrode and a liquid crystal layer, etc. As shown in FIG. 2, the size of the substrate 122 is larger than that of the substrate 112 so as to exposing an extending region 122a of the substrate 122. The contact pads 126 are disposed in the extending region 122a. The pixel layer 124 is electrically connected to the contact pads 126. In the present embodiment, the pixel layer 124 is electrically connected to a flexible printed circuit board of a panel driving circuit via the contact pads 126. However, in other embodiments, if the touch-sensing liquid crystal panel adopts a chip-on-glass (COG) technique, the pixel layer 124 may be electrically connected directly to the panel driving circuit ICD disposed on the extending region 122a, as shown in FIG. 1b, and the panel driving circuit needs the contact pads 126 for electrically connecting to an external circuit. Herein, the contact pads 126 herein may be considered as contact pads of the panel driving circuit on the touch-sensing liquid crystal panel 100.

In the color filter substrate 110, the contact pads 114, the sensing array 116 and the color filters 118 are disposed on the substrate 112, in which the sensing array 116 and the color filters 118 are disposed respectively on two opposite surfaces of the substrate 112. The protective layer 111 is disposed on the sensing array 116 for protecting the sensing array 116. The color filters 118 are disposed between the substrate 112 and the transistor substrate 120. The color filters 118 include color resists 118a and a black matrix 118b. The color resists 118a may include a red resist, a blue resist and a green resist, but embodiments of the present disclosure are not limited thereto.

The sensing array 116 is electrically connected to the contact pads 114 for electrically connecting to a flexible printed circuit board of a touch-sensing circuit (not shown). Herein, the contact pads 114 may be considered as contact pads of the touch-sensing circuit on the touch-sensing liquid crystal panel 100. The touch-sensing circuit may detect an action from a user via the sensing array 116 and perform a predetermined operation according to a detection result.

The substrate 112 includes a visible region 112a, a first edge region 112b, a second edge region 122c, a third edge region 122d and a fourth edge region 112e. The first edge region 112b, the second edge region 122c, the third edge region 122d and the fourth edge region 112e are surrounding the visible region 112a. The first edge region 112b and the second edge region 112c have the same width W1, and the third edge region 112d and the fourth edge region 112e have the same width W2.

Figure 1C:
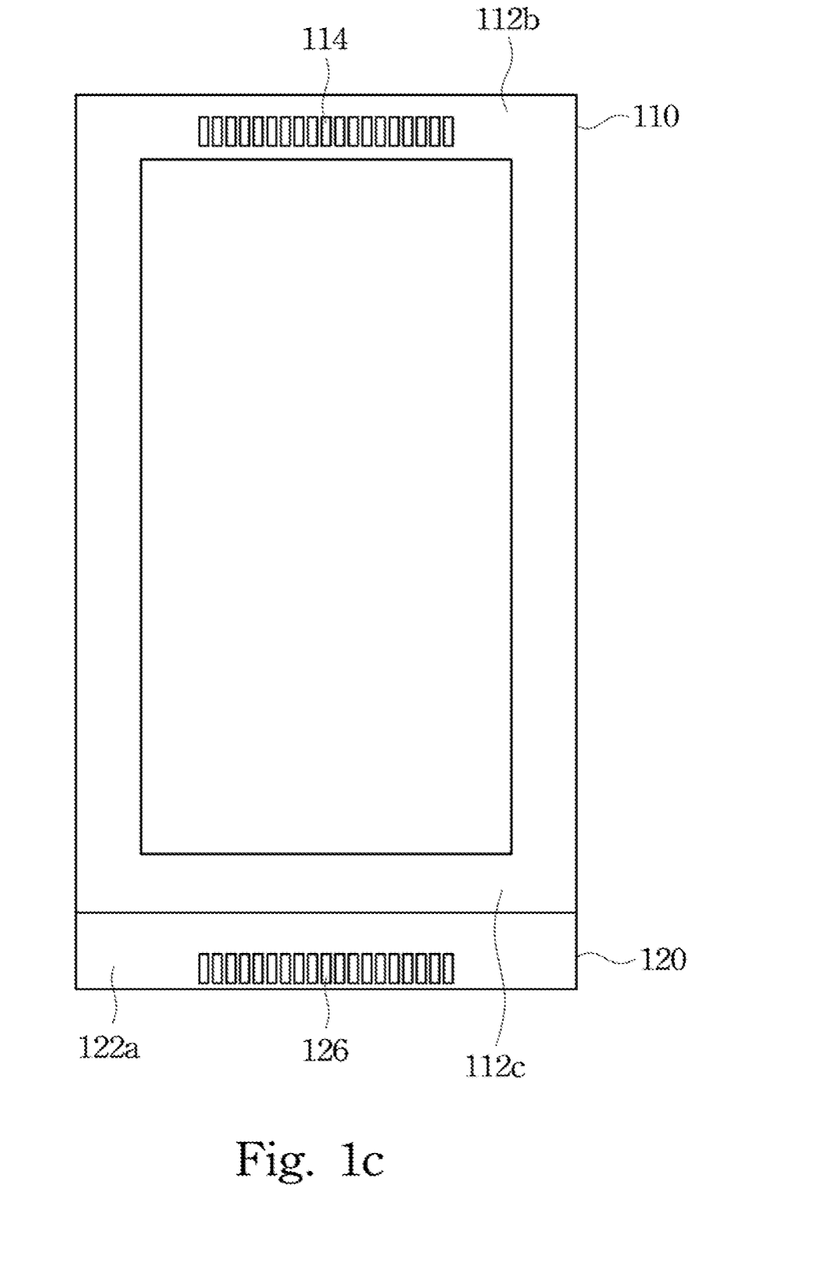
FIG. 1c is a schematic top view showing a touch-sensing liquid crystal panel in accordance with an embodiment of the present disclosure.

The contact pads 114 of the present embodiment are located at the first edge region 112b, such that the flexible printed circuit board of the touch-sensing circuit is not overlapped with that of the panel driving circuit when the flexible printed circuit board of the touch-sensing circuit is connected to the contact pads 114. Further, the positions of the contact pads 114 relative to the transistor substrate 120 may be flexibly changed because the first edge region 112b and the second edge region 112c have the same width. For example, the color filter substrate 110 is rotated by 180 degrees, as shown in FIG. 1c, thereby changing the positions of the contact pads.

Figure 3:
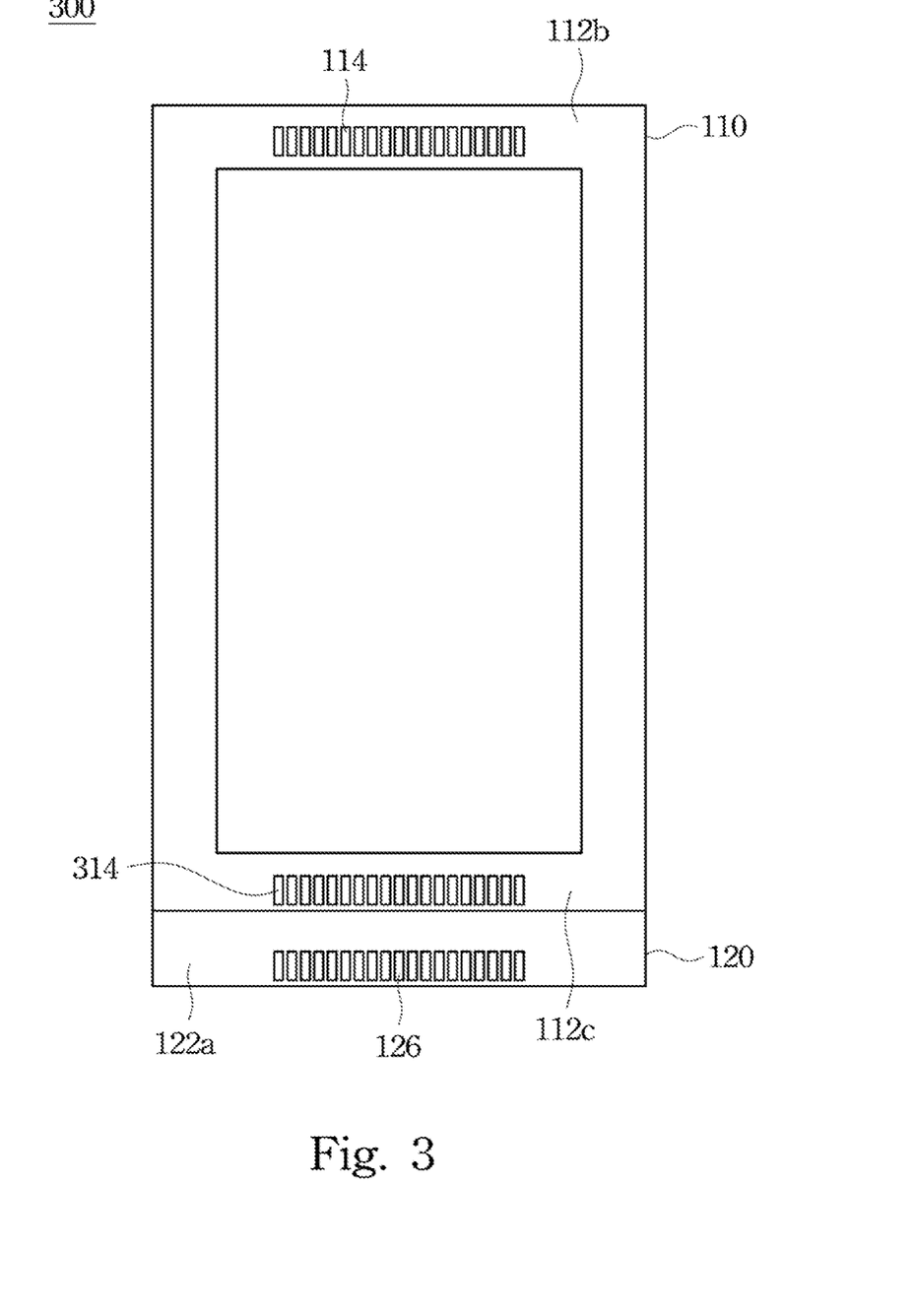
FIG. 3 is a schematic top view showing a touch-sensing liquid crystal panel in accordance with an embodiment of the present disclosure.
Figure 4:
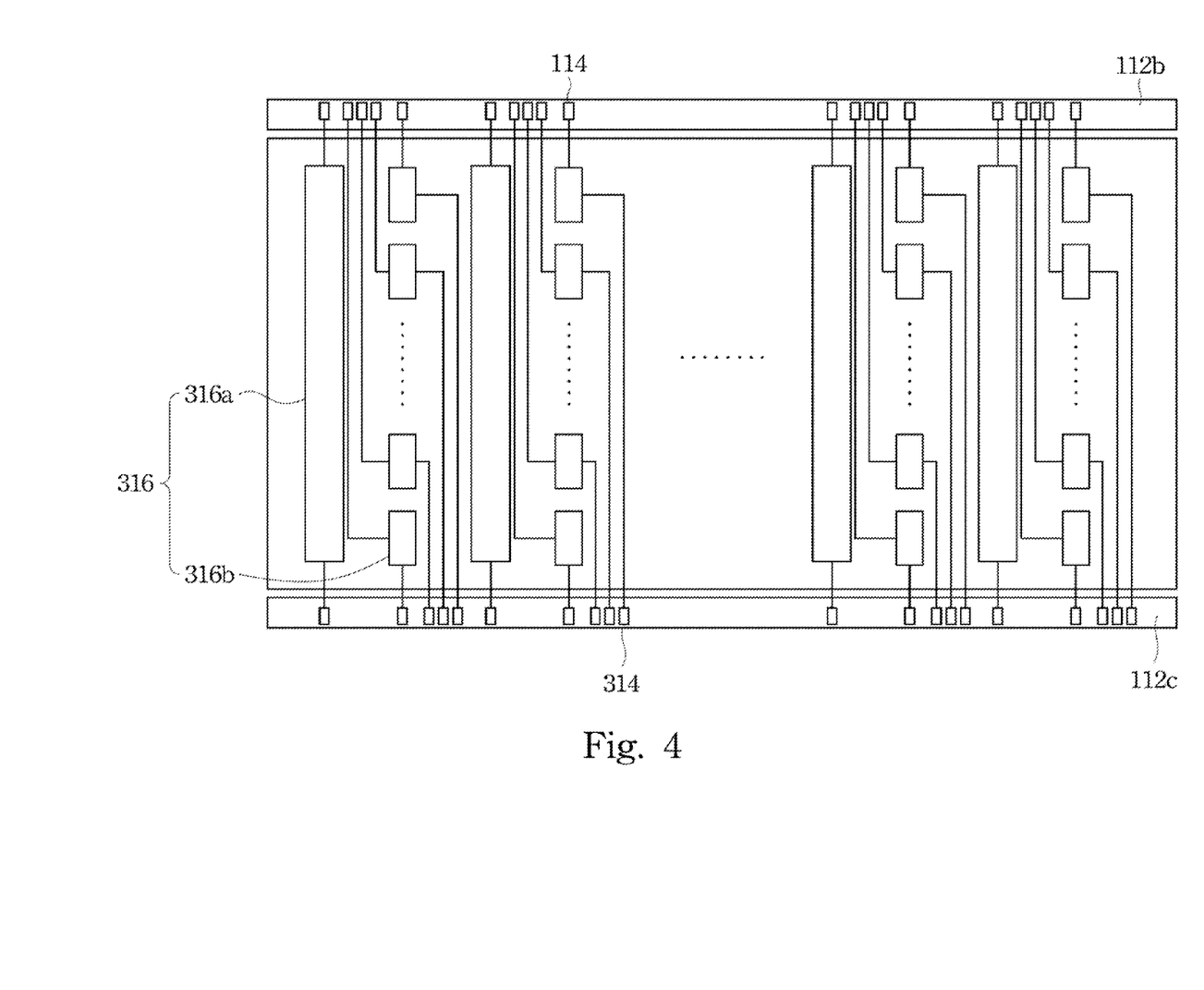
FIG. 4 is a schematic structural diagram showing a sensing array of the touch-sensing liquid crystal panel in accordance with an embodiment of the present disclosure.

Referring to FIG. 3 together with FIG. 4, FIG. 3 is a schematic op view showing a touch-sensing liquid crystal panel 300 in accordance with an embodiment of the present disclosure, and FIG. 4 is a schematic structural diagram showing a sensing array 316 of the touch-sensing liquid crystal panel 300. The structure of the touch-sensing liquid crystal panel 300 is similar to that of the touch-sensing liquid crystal panel 100, but different therefrom in that, the touch-sensing liquid crystal panel 300 includes contact pads 114 located at a first edge region 112b and contact pads 314 located at a second edge region 112c, and conductive patterns 316a and 316b of the sensing array 316 are respectively connected to the contact pads 114 and 314.

In the sensing array 316, the conductive patterns 316b are adjacent to the conductive pattern 316a, such that the conductive pattern 316a and the conductive patterns 316b form a capacitor structure. The conductive pattern 316a is used for receiving a touch-sensing scan signal Tx of a touch-sensing circuit. When a user touches the touch-sensing liquid crystal panel 300, each of the conductive patterns 316b outputs a sensing signal Rx to the touch-sensing circuit according to the touch-sensing scan signal and a capacitance change (or mutual capacitance) of the capacitor, such that the touch-sensing liquid crystal panel 300 can know a position touched by the user.

In the present embodiment, each conductive pattern 316a is electrically connected to one contact pad 114 and one contact pad 314, as shown in FIG. 4. Similarly, each conductive pattern 316b is electrically connected to one of the contact pads 114 and one of the contact pads 314. However, it is worthy to be noted that, in the present embodiment, one contact pad is only connected to one conductive pattern.

Because each of the conductive patterns 316a and 316b is connected to two contact pads at different positions, a user may determine the position to which a flexible printed circuit board of the touch-sensing circuit is connected according to actual requirements. For example, in order to preventing a signal from a panel driving circuit from affecting the sensing efficacy of a touch-sensing circuit, the flexible printed circuit board of the touch-sensing circuit may be connected to the contact pads 114 located at the first edge region 112b. For another example, when the influence of the signal from the panel driving circuit on the sensing efficacy of the touch-sensing circuit can be tolerated, the flexible printed circuit board of the touch-sensing circuit may be connected to the contact pads 314 located at the second edge region 112c. It is known from the above description that, the touch-sensing liquid crystal panel 300 of the present embodiment may provide flexible connecting methods for the flexible printed circuit board.

Figure 5A:
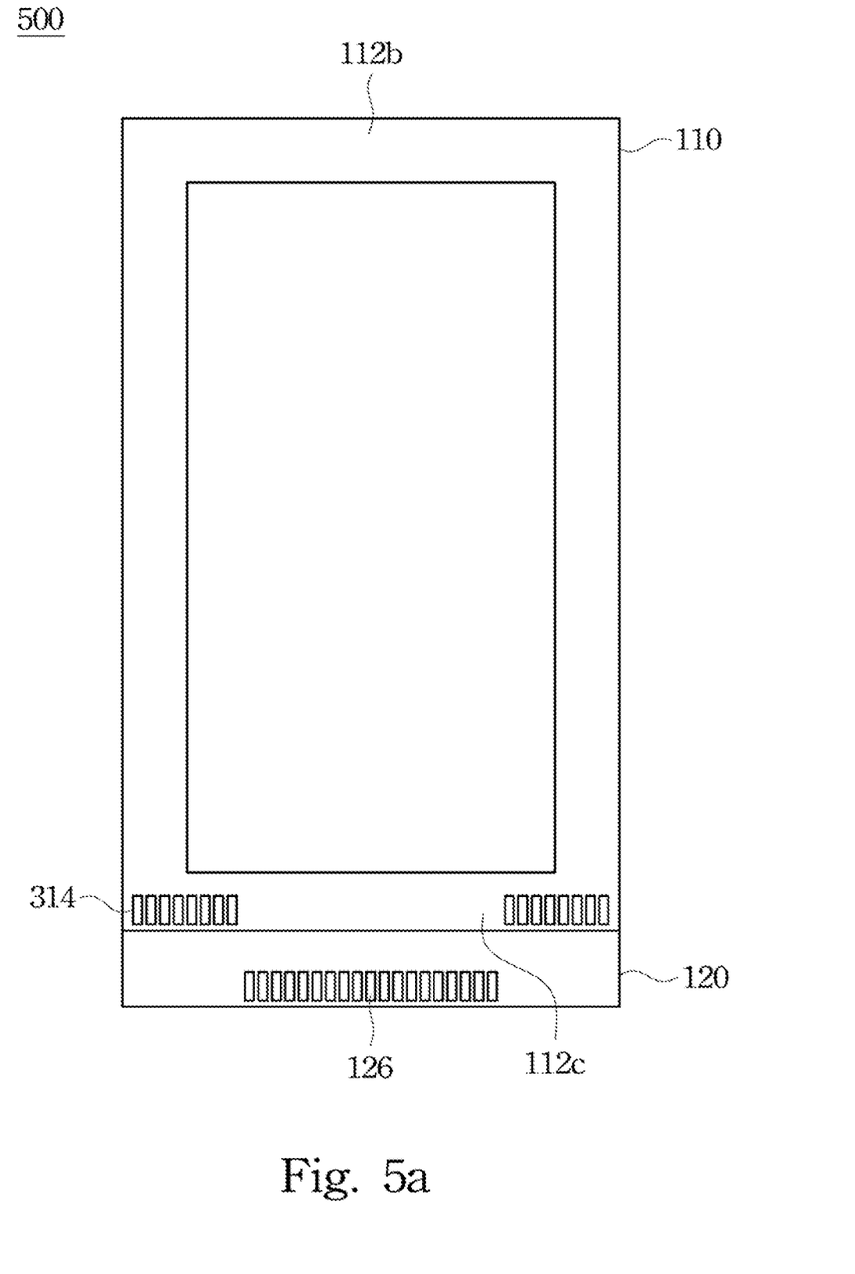
FIG. 5a is a schematic top view showing a touch-sensing liquid crystal panel in accordance with an embodiment of the present disclosure.
Figure 6:
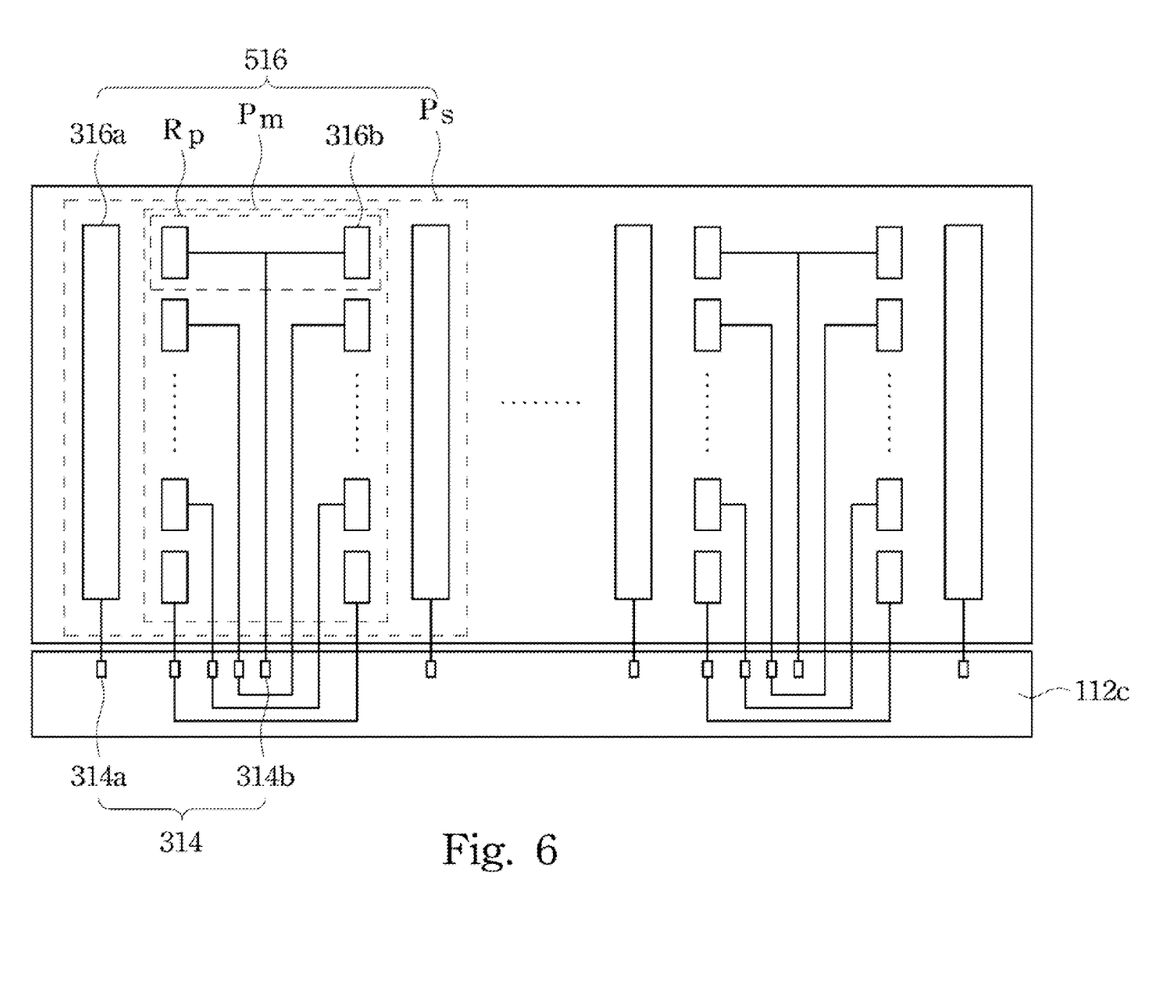
FIG. 6 is a schematic structural diagram showing a sensing array of the touch-sensing liquid crystal panel in accordance with an embodiment of the present disclosure.

Referring to FIG. 5a together with FIG. 6, FIG. 5a is a schematic top view showing a touch-sensing liquid crystal panel 500 in accordance with an embodiment of the present disclosure, and FIG. 6 is a schematic structural diagram showing a sensing array 516 of the touch -sensing liquid crystal panel 500. The structure of touch-sensing liquid crystal panel 500 is similar to that of the touch-sensing liquid crystal panel 300, but is different therefrom in that the touch-sensing liquid crystal panel 500 does not include contact pads 114 located at a first edge region 112b, and an arrangement of the sensing array 516 of the touch-sensing liquid crystal panel 500 is different from that of the touch-sensing liquid crystal panel 300.

The sensing array 516 includes conductive pattern sets Ps, and each of the conductive pattern sets Ps includes two conductive patterns 316 and a pattern array Pm, in which the pattern array Pm is located between the conductive patterns 316. The pattern array Pm includes conductive patterns 316b. The conductive patterns 316b are arranged in two columns and N rows to form the pattern array Pm, where N is a positive integer greater than 2. As shown in FIG. 6, conductive patterns in each of the conductive pattern rows are electrically connected to each other, and the conductive pattern rows are connected to contact pads 314b in a one-to-one manner. In the present embodiment, contact pads 314 include contact pads 314a and 314b. The contact pad 314a is corresponding to a touch-sensing scan signal Tx, and the contact pads 314b are corresponding to a sensing signal Rx.

In the present embodiment, because every two conductive patterns 316b are corresponding to one contact pad 314b, the number of the contact pads of the touch-sensing liquid crystal panel 500 is smaller than that of the touch-sensing liquid crystal panel 100. The number of the contact pads (contact pads 314a and 314b) satisfies the following relationship:

$$P=(2+N)*M,$$

where P representing the number of the contact pads, M representing the number of the conductive pattern sets Ps, N representing the number of the conductive pattern rows Rp of each of the conductive pattern sets Ps.

Figure 5B:
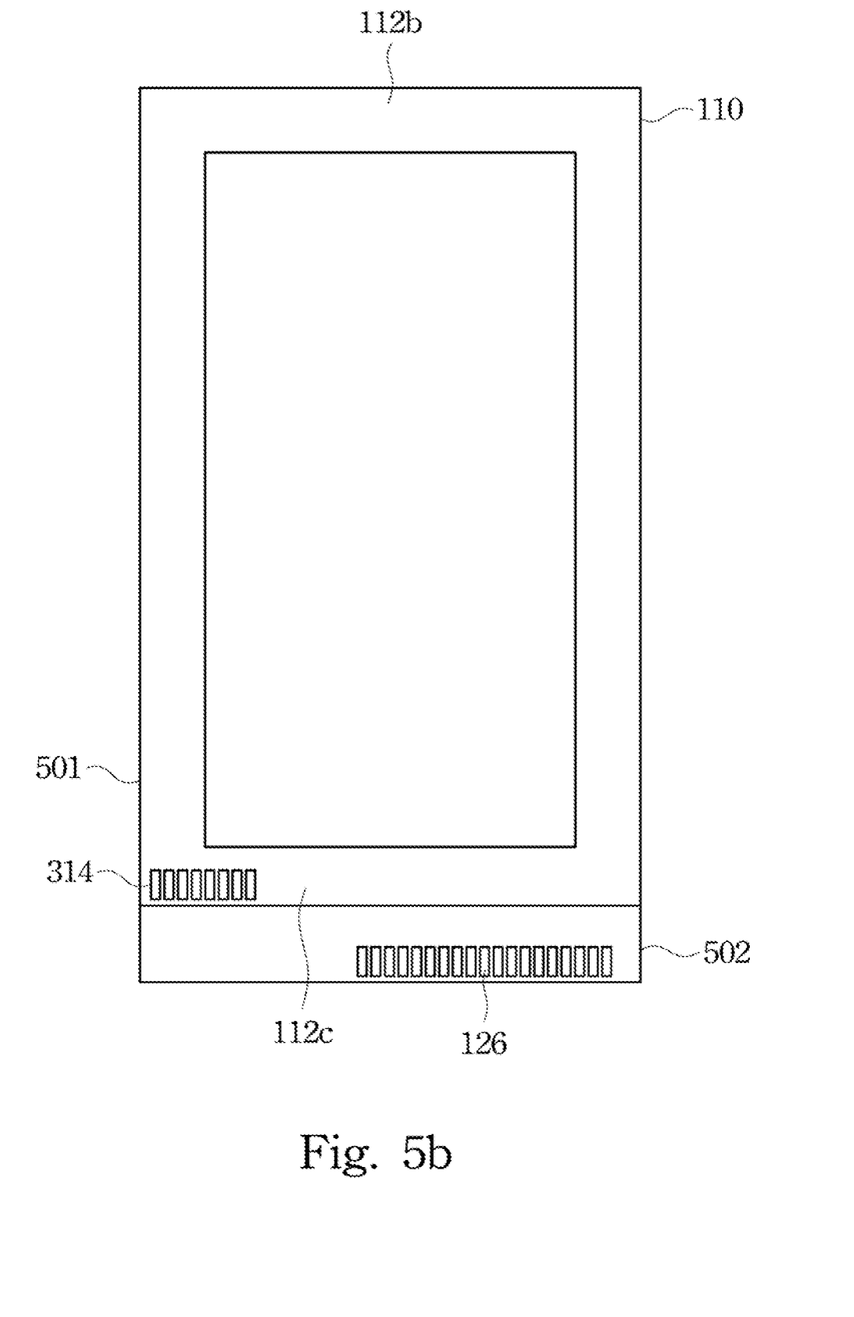
FIG. 5b is a schematic top view showing a touch-sensing liquid crystal panel in accordance with an embodiment of the present disclosure.

Because the number of the contact pads of the touch-sensing liquid crystal panel 500 of the present embodiment is smaller than that of the touch-sensing liquid crystal panel 100, contact pads 126 of a transistor substrate 120 and the contact pads 314 of a color filter substrate 110 are alternately disposed. As shown in FIG. 5a and FIG. 5b, the contact pads 126 of the transistor substrate 120 are disposed between the contact pads 314 of the color filter substrate 110. Therefore, a flexible printed circuit board of a touch-sensing circuit is not overlapped with that of a panel driving circuit when the flexible printed circuit board of the touch-sensing circuit is connected to the contact pads 314.

Further, it is worthy to be noted that an arrangement of the contact pads 314 and the contact pads 126 is not limited to the present embodiment. In other embodiments of the present disclosure, the contact pads 314 may extend from a side 501 of a panel toward another side 502 of the panel, and the contact pads 126 may extend from the side 502 of the panel toward the side 501 of the panel, as shown in FIG. 5b. In the present embodiment, the panel driving circuit contact pads (i.e., contact pads 126) and the touch-sensing circuit contact pads 314 are alternately disposed.

Although the present disclosure has been described above as in some embodiments, it is not used to limit the present disclosure. It will be intended to those skilled in the art that various modifications and variations can be made to the structure of the present disclosure without departing from the scope or spirit of the disclosure. Therefore, the scope of the disclosure is to be defined solely by the appended claims.

What is claimed is:

1. A touch-sensing liquid crystal panel, comprising:
 a color filter substrate, comprising:
  a first substrate having a visible region and a plurality of edge regions surrounding the visible region, the edge regions comprising:
   a first edge region; and
   a second edge region opposite to the first edge region;
  a plurality of touch-sensing circuit contact pads disposed in the first edge region;
  a sensing array disposed on the first substrate and electrically connected to the touch-sensing circuit contact pads; and
  a plurality of color filters disposed on the first substrate; and
 a transistor substrate, comprising:
  a second substrate having an extending region with a plurality of panel driving circuit contact pads, wherein the second edge region is located between the first edge region and the extending region; and
  a plurality of pixel units disposed on the second substrate.

2. The touch-sensing liquid crystal panel of claim 1, wherein the pixel units are sandwiched between the second substrate and the color filters, and each of the pixel units comprises a transistor switch and a pixel electrode.

3. The touch-sensing liquid crystal panel of claim 1, wherein a width of the first edge region is substantially the same as a width of the second edge region.

4. The touch-sensing liquid crystal panel of claim 1, wherein the edge regions further comprise a third edge region and a fourth edge region, and a width of the third edge region is the same as a width of the fourth edge region, wherein the third edge region and the fourth edge region are located between the first edge region and the second edge region and are opposite to each other.

5. A touch-sensing liquid crystal panel, comprising:
a color filter substrate, comprising:
   a first substrate with a visible region and a plurality of edge regions surrounding the visible region, the edge regions comprising:
      a first edge region; and
      a second edge region opposite to the first edge region;
   a plurality of first touch-sensing circuit contact pads disposed in the second edge region;
   a plurality of second touch-sensing circuit contact pads disposed in the first edge region;
   a sensing array disposed on the first substrate and comprising a plurality of conductive patterns, wherein each of the conductive patterns is electrically connected to one of the first touch-sensing circuit contact pads or one of the second touch-sensing circuit contact pads; and
   a plurality of color filters disposed on the first substrate; and
a transistor substrate, comprising:
   a second substrate; and
   a plurality of pixel units disposed on the second substrate.

6. The touch-sensing liquid crystal panel of claim 5, wherein the pixel units are sandwiched between the second substrate and the color filters, and each of the pixel units comprises a transistor switch and a pixel electrode.

7. The touch-sensing liquid crystal panel of claim 5, wherein the conductive patterns comprise:
   a first conductive pattern for receiving a touch-sensing scan signal; and
   a plurality of second conductive patterns adjacent to the first conductive pattern, wherein each of the second conductive patterns is used for outputting a sensing signal according to the touch-sensing scan signal and a touching action of a user.

8. The touch-sensing liquid crystal panel of claim 7, further comprising:
   a touch-sensing controller for transferring the touch-sensing scan signal to the sensing array and receiving the sensing signal through the first touch-sensing circuit contact pads or the second touch-sensing circuit contact pads.

9. A touch-sensing liquid crystal panel, comprising:
a color filter substrate, comprising:
   a first substrate with a visible region and a plurality of edge regions surrounding the visible region, the edge regions comprising:
      a first edge region; and
      a second edge region opposite to the first edge region;
   a plurality of touch-sensing circuit contact pads disposed in the second edge region;
   a sensing array disposed on the first substrate and electrically connected to the touch-sensing circuit contact pads, wherein the sensing array comprises a plurality of conductive pattern sets, each of the conductive pattern sets comprising:
      two first conductive patterns; and
      a plurality of conductive pattern rows disposed between the two first conductive patterns, wherein each of the conductive pattern rows comprises two second conductive patterns electrically connected to each other, and each of the conductive pattern rows is electrically connected to one of the touch-sensing circuit contact pads;
   a plurality of color filters disposed on the first substrate; and
a transistor substrate, comprising:
   a second substrate; and
   a plurality of pixel units disposed on the second substrate.

10. The touch-sensing liquid crystal panel of claim 9, wherein the pixel units are sandwiched between the second substrate and the color filters, and each of the pixel units comprises a transistor switch and a pixel electrode.

11. The touch-sensing liquid crystal panel of claim 9, wherein the second conductive patterns of each of the conductive pattern sets are arranged in a pattern matrix having two pattern rows, wherein one of the first conductive patterns is used for receiving a touch-sensing scan signal, and each of the second conductive patterns of one of the pattern rows is used for outputting a sensing signal according to the touch-sensing scan signal and a touching action of a user.

12. The touch-sensing liquid crystal panel of claim 11, further comprising a touch-sensing controller for transferring the touch-sensing scan signal to the sensing array and receiving the sensing signal through the touch-sensing circuit contact pads.

13. The touch-sensing liquid crystal panel of claim 9, wherein the number of the touch-sensing circuit contact pads satisfies the following relationship:

$$P=(2+N)*M;$$

wherein P representing the number of the touch-sensing circuit contact pads, M representing the number of the conductive pattern sets, N representing the number of the conductive pattern rows of each of the conductive pattern sets.

14. The touch-sensing liquid crystal panel of claim 1, wherein the panel driving circuit contact pads and the touch-sensing circuit contact pads are alternately disposed.

* * * * *